(12) United States Patent
Chou

(10) Patent No.: US 8,144,035 B2
(45) Date of Patent: Mar. 27, 2012

(54) SLIM SELF-LUMINOUS KEYBOARD STRUCTURE

(75) Inventor: Chin-Wen Chou, Taipei Hsien (TW)

(73) Assignee: Zippy Technology Corp., Hsin-Tien, Taipei Hsien (TW)

(*) Notice: Subject to any disclaimer, the term of this patent is extended or adjusted under 35 U.S.C. 154(b) by 905 days.

(21) Appl. No.: 12/185,383

(22) Filed: Aug. 4, 2008

(65) Prior Publication Data
US 2010/0026528 A1 Feb. 4, 2010

(51) Int. Cl.
*H03K 17/94* (2006.01)

(52) U.S. Cl. .......................................... 341/22
(58) Field of Classification Search ........ 341/22
See application file for complete search history.

(56) References Cited

U.S. PATENT DOCUMENTS

| | | | |
|---|---|---|---|
| 4,163,138 A * | 7/1979 | Harden | 200/310 |
| 5,936,554 A | 8/1999 | Stanek | |
| 6,179,432 B1 | 1/2001 | Zhang | |
| 6,199,996 B1 | 3/2001 | Katrinecz | |
| 6,217,183 B1 | 4/2001 | Shipman | |
| 6,284,988 B1 | 9/2001 | Wantanabe | |
| 6,322,229 B1 | 11/2001 | Chan | |
| 6,554,442 B2 | 4/2003 | Chou | |
| 6,590,508 B1 | 7/2003 | Howell | |
| 6,648,530 B2 | 11/2003 | Kamei | |
| 6,860,612 B2 | 3/2005 | Chiang | |
| 7,235,752 B1 | 6/2007 | Chen | |
| 7,239,303 B2 | 7/2007 | Liao | |
| 7,278,750 B2 | 10/2007 | Cheng | |
| 7,283,066 B2 * | 10/2007 | Shipman | 341/22 |
| 7,388,167 B2 | 6/2008 | Liao | |

FOREIGN PATENT DOCUMENTS

| | | |
|---|---|---|
| TW | 509955 | 11/2002 |
| TW | 516671 | 1/2003 |
| TW | 566612 | 12/2003 |
| TW | 581961 | 4/2004 |
| TW | 587800 | 5/2004 |
| TW | 594546 | 6/2004 |
| TW | M240668 | 8/2004 |
| TW | I230957 | 4/2005 |
| TW | I231693 | 4/2005 |
| TW | M313281 | 6/2007 |

* cited by examiner

*Primary Examiner* — Robert L. Deberadinis
(74) *Attorney, Agent, or Firm* — Muncy, Geissler, Olds & Lowe, PLLC

(57) ABSTRACT

A slim self-luminous keyboard structure comprises a keyboard unit and luminous units. The keyboard unit has a press plane containing a plurality of press members, and a baseplate is arranged below the press plane and supporting the press members. The luminous units generate light, and the light is conducted to a luminous space defined by the press plane and the baseplate to make the luminous space have brightness sufficient to enable users to recognize the press members. The slim self-luminous keyboard structure does not use a backlight plate. Therefore, the present invention can reduce the thickness of a self-luminous keyboard and facilitate fabricating a slim self-luminous keyboard.

20 Claims, 8 Drawing Sheets

SLIM SELF-LUMINOUS KEYBOARD STRUCTURE

FIELD OF THE INVENTION

The present invention relates to a keyboard structure, particularly to a slim self-luminous keyboard structure.

BACKGROUND OF THE INVENTION

The keyboard has been an indispensable device in the current computer system, and keyboard design is also diversified to meet various application occasions of computer systems. For a dim or dark environment, manufacturers had developed several self-luminous keyboards to enable users to accurately press correct keys. For example, U.S. Pat. No. 5,936,554 and No. 7,278,750, Taiwan patents No. 566612 and No. 581961 respectively disclosed keyboard devices having LED inside keys, wherein each single key is illuminated by the LED thereinside, whereby users can make out the keys in a dim or dark environment. The prior arts can indeed solve the abovementioned problem. However, a standard keyboard may have over one hundred keys, and the prior-art keyboard devices need the same number of LEDs, which not only increases the fabrication steps and cost but also impairs the lightweighting of keyboards. Besides, numerous LEDs consume a lot of power and generate considerable heat.

For other types of self-luminous keyboards, refer to U.S. Pat. Nos. 6,179,432, 6,199,996, 6,217,183, 6,284,988, 6,322,229, 6,554,442, 6,590,508, 6,648,530, 6,860,612, 7,235,752, 7,239,303 and 7,388,167, and Taiwan patents Nos. 509955, 516671, 587800, 594546, I230957, I231693, M240668, and M313281, wherein a backlight plate, such as an electroluminescent sheet or an optical fiber panel, is arranged over or below a baseplate of a keyboard, whereby light permeates between the keys enable users to make out the keys. In such a type of self-luminous keyboards, the entire keyboard is lightened by a single backlight plate, which can reduce the number of components and simplify the assemblage. Besides, the electroluminescent sheet and the optical fiber panel consume very little power and favor the long time usage of a self-luminous keyboard. However, this type of self-luminous keyboards needs a backlight plate arranged above or below the baseplate, which increases the thickness and impairs fabricating a slim keyboard.

SUMMARY OF THE INVENTION

The primary objective of the present invention is to reduce the thickness of a self-luminous keyboard and facilitate fabricating a slim self-luminous keyboard. To achieve the abovementioned objective, the present invention proposes a slim self-luminous keyboard structure comprising a keyboard unit and luminous units. The keyboard unit has a press plane containing a plurality of press members, and a baseplate arranged below the press plane and supporting the press members. The luminous units generate light, and the light is conducted to a luminous space defined by the press plane and the baseplate to make the luminous space have brightness sufficient to enable users to make out the press members. In the present invention, the direction of the light projected by the luminous units can be adjusted to attain the desired illumination state. For example, the light projected by the luminous units is parallel to the baseplate; the height of the light projected by the luminous units increases with the distance from the luminous units; the light beam projected by the luminous units and the edge of the press plane contain a projection angle. The light generated by the luminous units is directly conducted into the luminous space. Alternatively, a light conduction element is arranged inside the luminous space and used to uniformly distribute the light in the luminous space. The luminous units may adopt at least an LED or a laser device. The luminous space has parallel light conduction channels between each two press members. The luminous units are arranged in the ends of the light conduction channels and supply light to the light conduction channels. Alternatively, the luminous units are arranged inside the light conduction channels and supply light to the light conduction channels from both sides thereof.

To make the press members have a higher recognizability, reflection elements or luminescent elements are arranged inside the luminous space and corresponding to the press members. The press members are made of a transparent material. Alternatively, the press member has a transparent character region and an opaque non-character region.

The present invention applies to several types of keyboard structures. In one embodiment, an actuation mechanism is used to couple the press members and the baseplate and has elastic members enabling the press members to move up and down with respect to the baseplate; the actuation mechanism or the elastic members may be made of a luminescent material. In another embodiment, the press members and the baseplate respectively have key rods and key seats corresponding to each other; each key seat has an opening at the top thereof, and the key rod is inserted into the opening; the key seat also has an elastic member thereinside, and the tip of the key rod is corresponding to the elastic member, whereby the press member can move up and down with respect to the key seat and the key rod; the key rods, the key seats or the elastic members may be made of a luminescent material.

The slim self-luminous keyboard structure of the present invention needn't prepare luminous units for all the keys. Thus, the present invention requires fewer components and consumes less power. Contrasting with the traditional self-luminous keyboards that adopt an electroluminescent sheet or an optical fiber panel, the present invention does not use a backlight plate; therefore, the present invention can reduce the thickness of a self-luminous keyboard and facilitate fabricating a slim self-luminous keyboard.

DETAILED DESCRIPTION OF THE PREFERRED EMBODIMENTS

Below, the technical contents of the present invention are described in detail in cooperation with the drawings.

Figure 1:
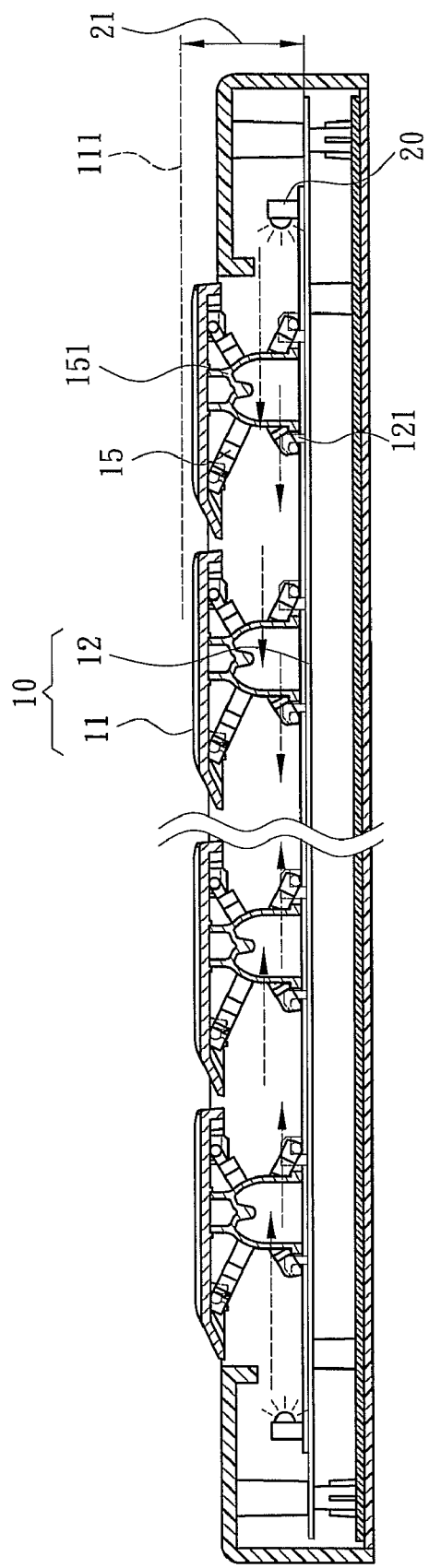
FIG. 1 is a sectional view schematically showing a slim self-luminous keyboard structure according to a preferred embodiment of the present invention.

Refer to FIG. 1, a sectional view schematically showing a slim self-luminous keyboard structure according to a preferred embodiment of the present invention. In this embodiment, the slim self-luminous keyboard structure of the present invention comprises a keyboard unit 10 and luminous units 20. The keyboard unit 10 has a press plane 111 containing a plurality of press members 11, and a baseplate 12 arranged below the press plane 111 and supporting the press members 11. When this embodiment is applied to a bridge-actuation type keyboard, an actuation mechanism 15 is arranged between the press members 11 and the baseplate 12, coupled to the press members 11 and the baseplate 12, and fixed to the baseplate 12 by fix members 121 of the baseplate 12. The actuation mechanism 15 has elastic members 151, whereby the press members 11 can move up and down with respect to the baseplate 12. In this embodiment, the luminous units 20 are arranged over the baseplate 12 and generate light parallel to the baseplate 12. The light is conducted to a luminous space 21 defined by the press plane 111 and the baseplate 12. The luminous space 21 has brightness sufficient to enable users to make out the press members 11. The luminous unit 20 may adopt LED or a laser device. The light generated by the luminous units 20 is directly conducted into the luminous space 21. Alternatively, a light conduction element is arranged inside the luminous space 21 and used to uniformly distribute the light in the luminous space 21. The light conduction element may be made of an optical fiber or polycarbonate.

Figure 2:
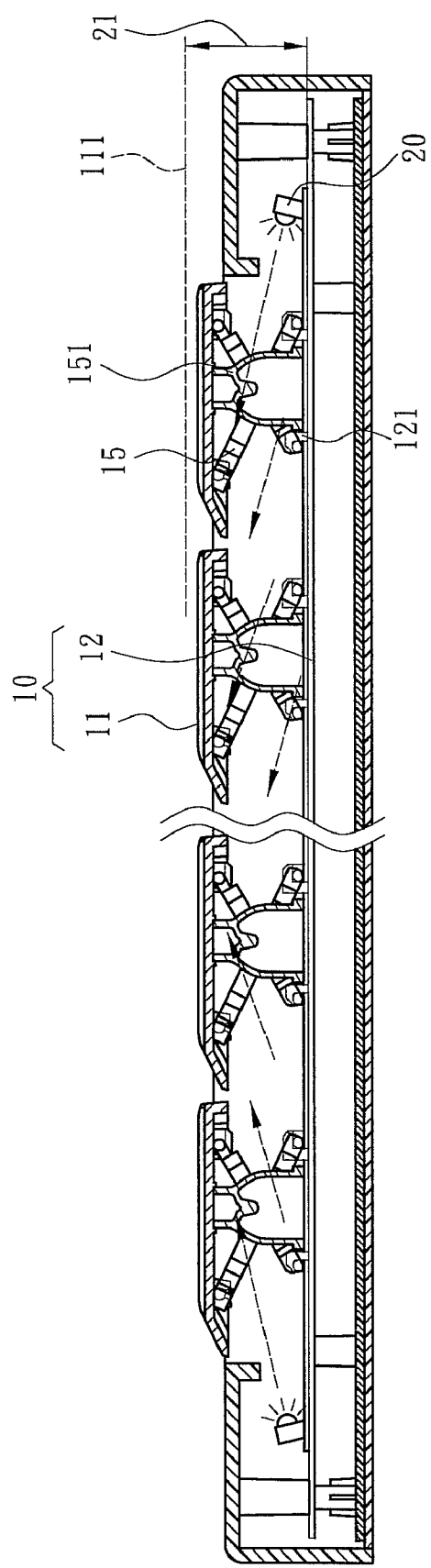
FIG. 2 is a diagram schematically showing that the height of light beam projected by the luminous units increases with the projection distance according to the present invention.
Figure 3:
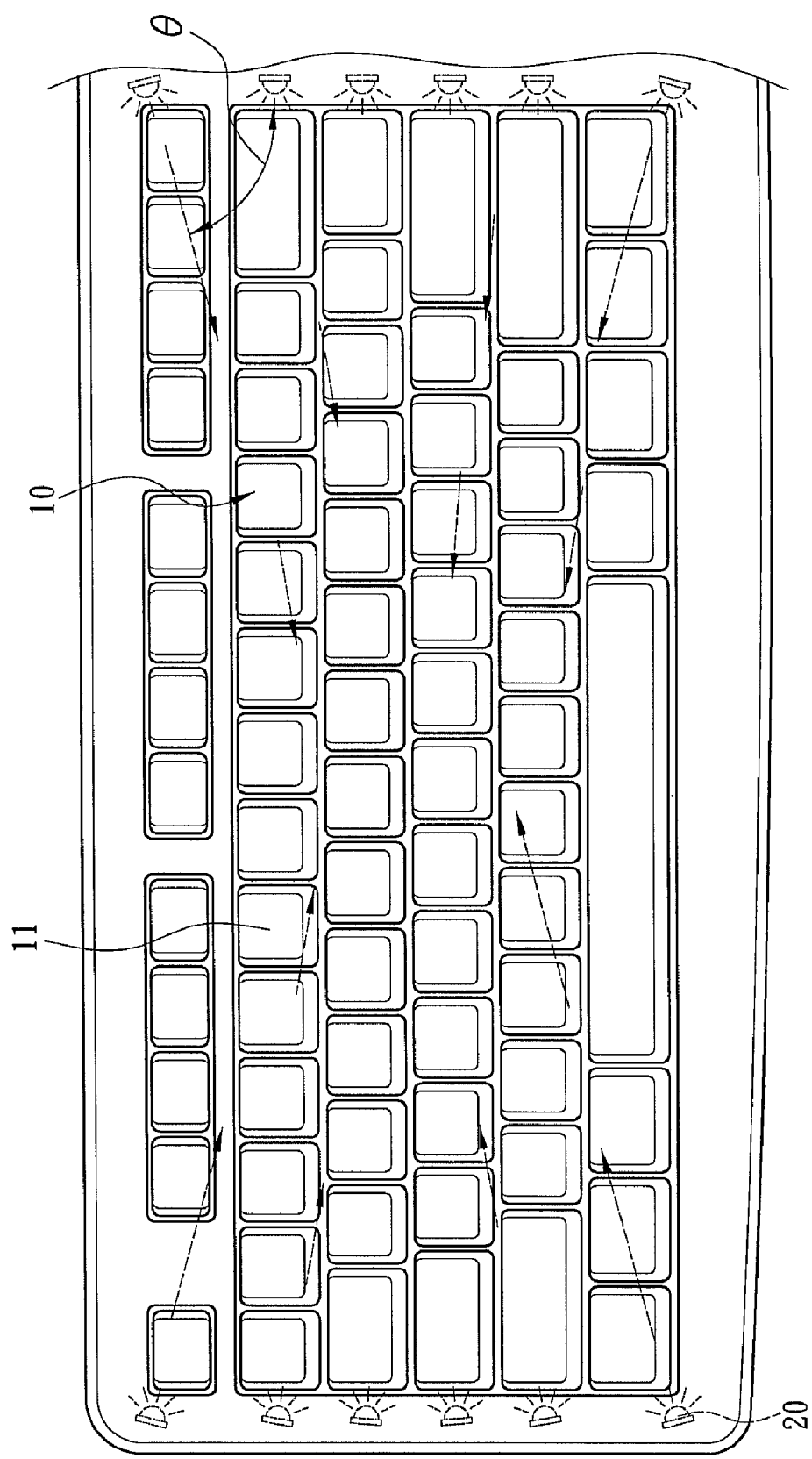
FIG. 3 is a diagram schematically showing that a projection angle is contained by the light beam projected by the luminous units and the edge of the press plane according to the present invention.

In addition to the abovementioned projection direction parallel to the baseplate 12, the light generated by the luminous unit 20 may also has another projection direction. Refer to FIG. 2. The light beam generated by the luminous unit 20 has such a projection direction that the height of the light beam increases with the distance from the light source. Generally, the light beam having a projection direction parallel to the baseplate 12 cannot provide identical illumination for the near-end and far-end press members 11. Thus, the press plane 111 is non-uniformly lightened. Adjusting the projection angle of the light beam to make the height of the light beam increase with the distance can provide different but appropriate amounts of light for the near-end and far-end press members 11, whereby the press plane 111 is uniformly lightened. Refer to FIG. 3. The light beam generated by the luminous unit 20 also has a projection angle θ with respect to the edge of the press plane 111. The projection angle θ is varied between 0 and 180 degrees to attain the best illumination condition.

Figure 4:
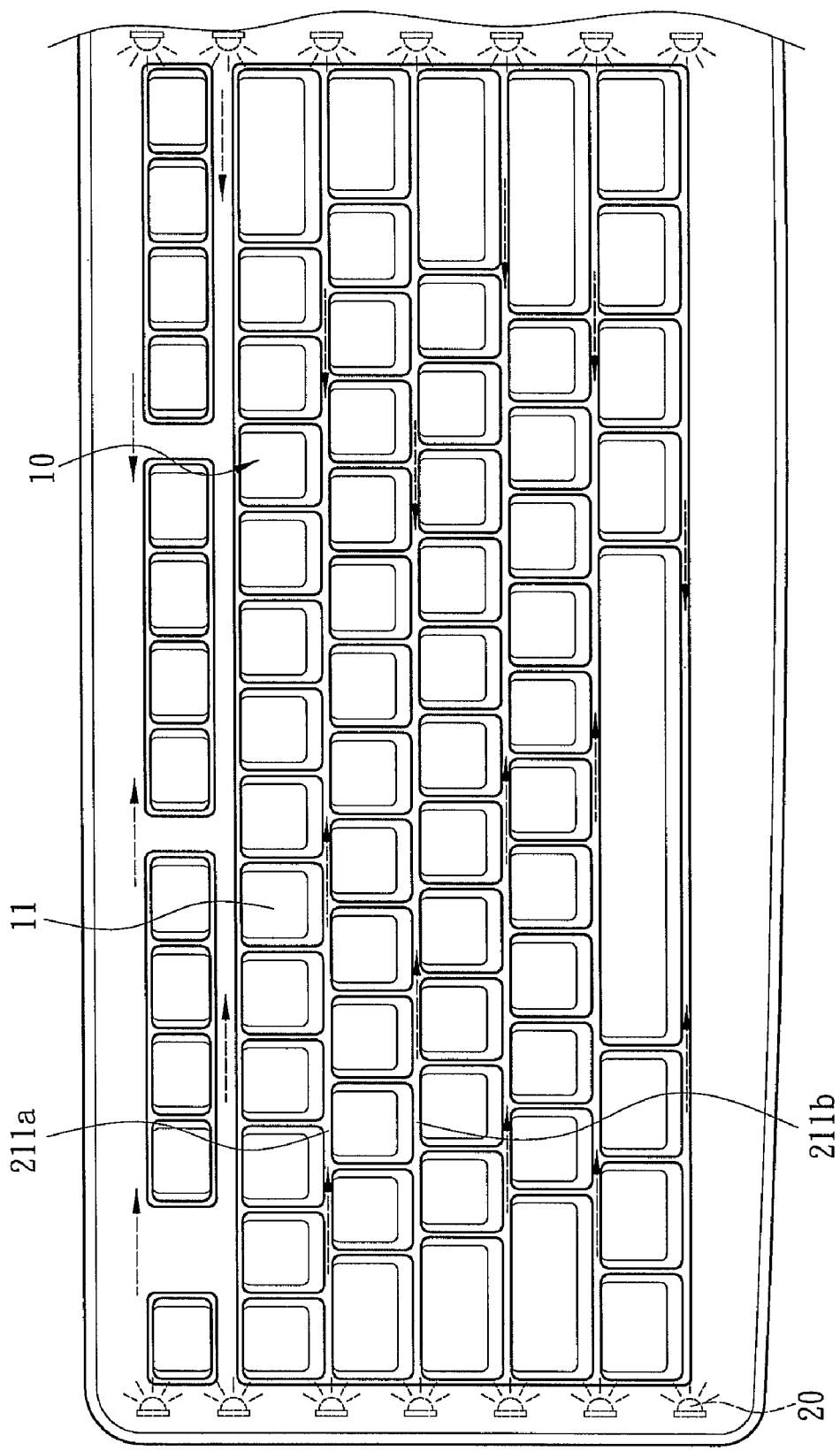
FIG. 4 is a diagram schematically showing that the luminous units are arranged in the ends of the light conduction channels according to the present invention.
Figure 5:
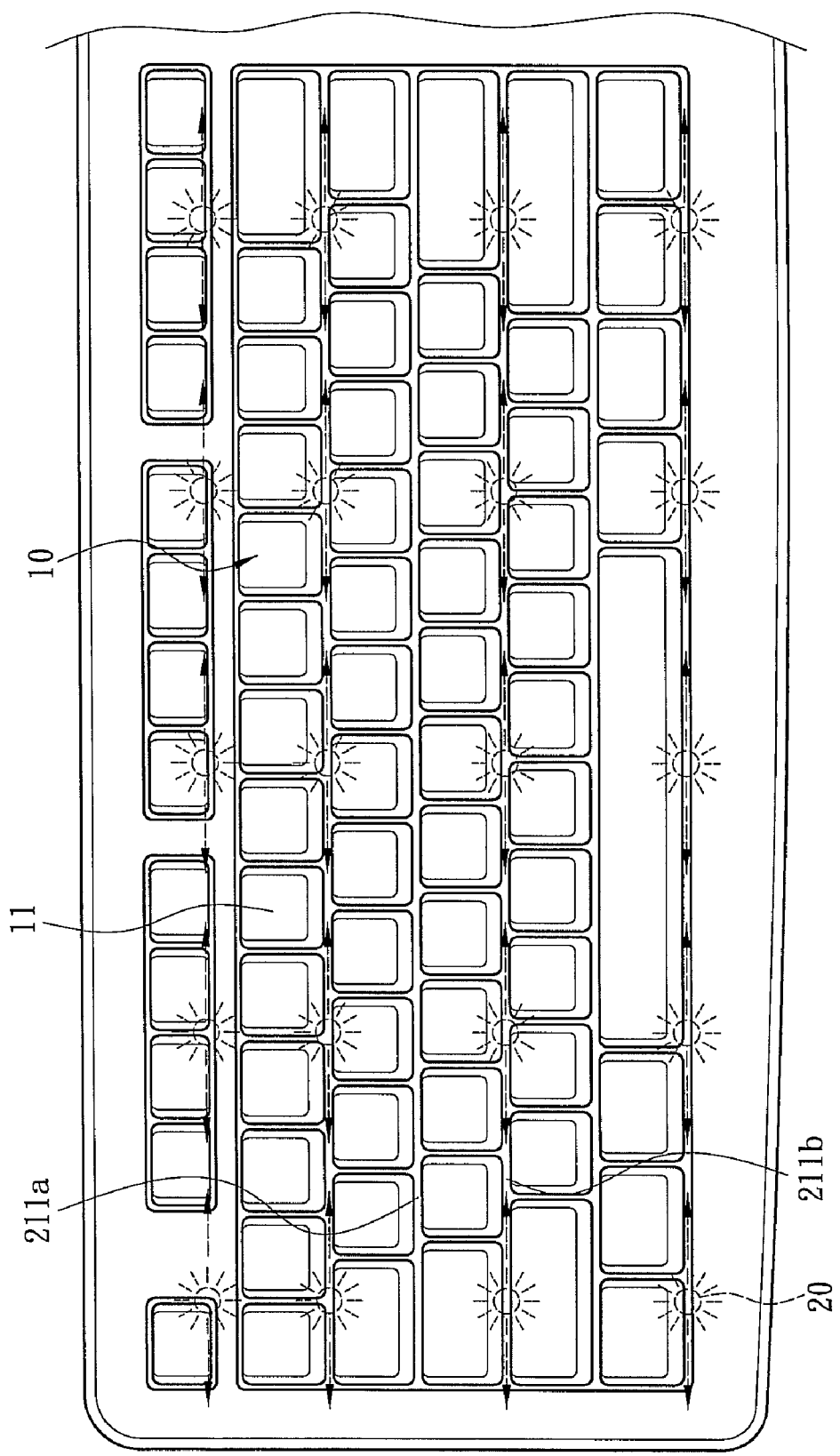
FIG. 5 is a diagram schematically showing that the luminous units are arranged inside the light conduction channels according to the present invention.

Refer to FIG. 4. The luminous space 21 has parallel light conduction channels 211a and 211b between each two press members 11. The luminous units 20 are arranged in the ends of the light conduction channels 211a and 211b and supply light to the light conduction channels 211a and 211b along a single direction. Refer to FIG. 5. Alternatively, the luminous units 20 are arranged inside the light conduction channels 211a and 211b and supply light to the light conduction channels 211a and 211b along two sides.

Figure 6:
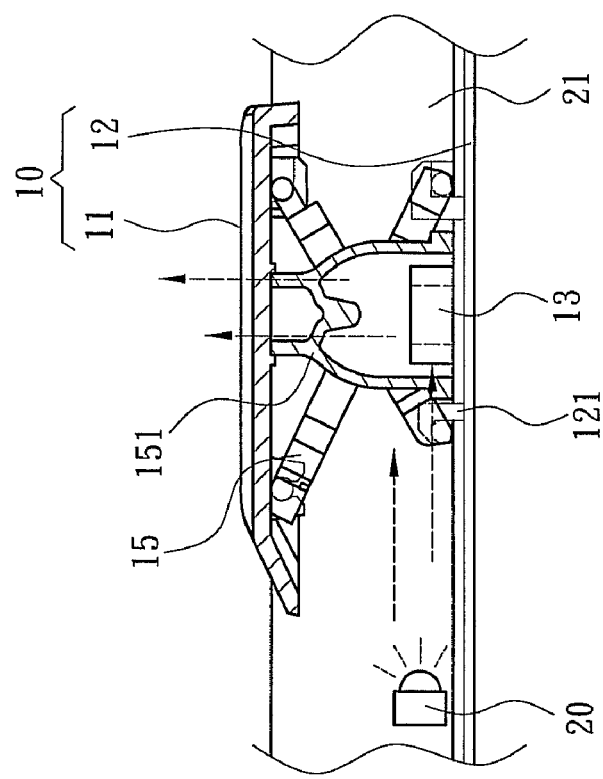
FIG. 6 is a diagram schematically showing that reflection elements are arranged below the press members according to a preferred embodiment of the present invention.
Figure 7:
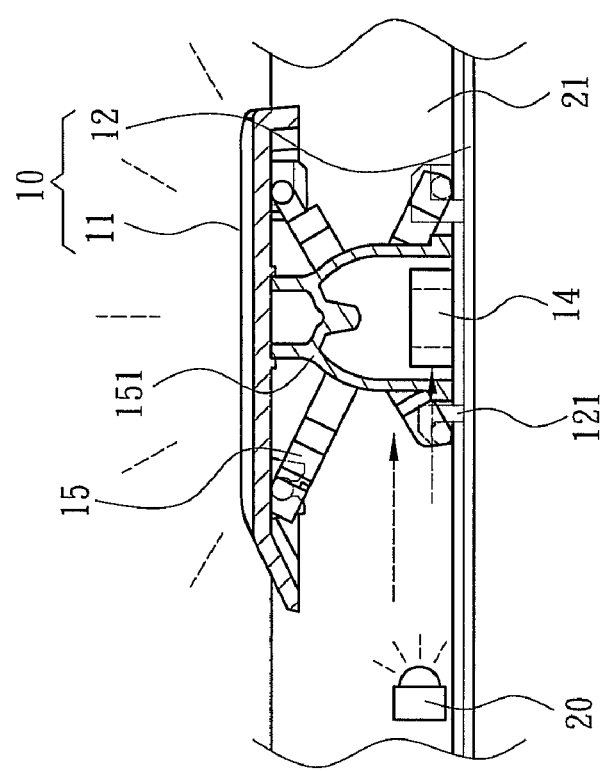
FIG. 7 is a diagram schematically showing that luminescent elements are arranged below the press members according to a preferred embodiment of the present invention.

Via the abovementioned structure, the light generated by the luminous units 20 are uniformly conducted into the luminous space 21 and provide a uniform illumination for the luminous space 21, as shown in FIG. 1. In a special environment, or for a special need of a user, the individual press member 11 is required to have a higher brightness. Therefore, reflection elements 13 are arranged inside the luminous space 21 and corresponding to the press members 11, as shown in FIG. 6. The reflection elements 13 can change the direction of the light path and make the light projected from the press members 11, whereby the intended press members 11 can have a higher brightness than the adjacent luminous space 21. Alternatively, luminescent elements 14 are arranged inside the press members 11, as shown in FIG. 7. The luminescent elements 14 are coated with or made of a fluorescent or phosphorescent material. The luminescent elements 14 absorb the light inside the luminous space 21 and generate a luminescent effect, whereby the intended press members 11 can have a higher brightness than the adjacent luminous space 21. Via the reflection element 13 or the luminescent member 14, the keyboard structure of the present invention can have a non-uniform lightening effect. When this embodiment is applied to a bridge-actuation type keyboard, the actuation mechanism 15 or the elastic members 151 may also be made of a luminescent material, whereby the press members 11 thereabove can have a higher brightness than the adjacent luminous space 21.

Figure 8:
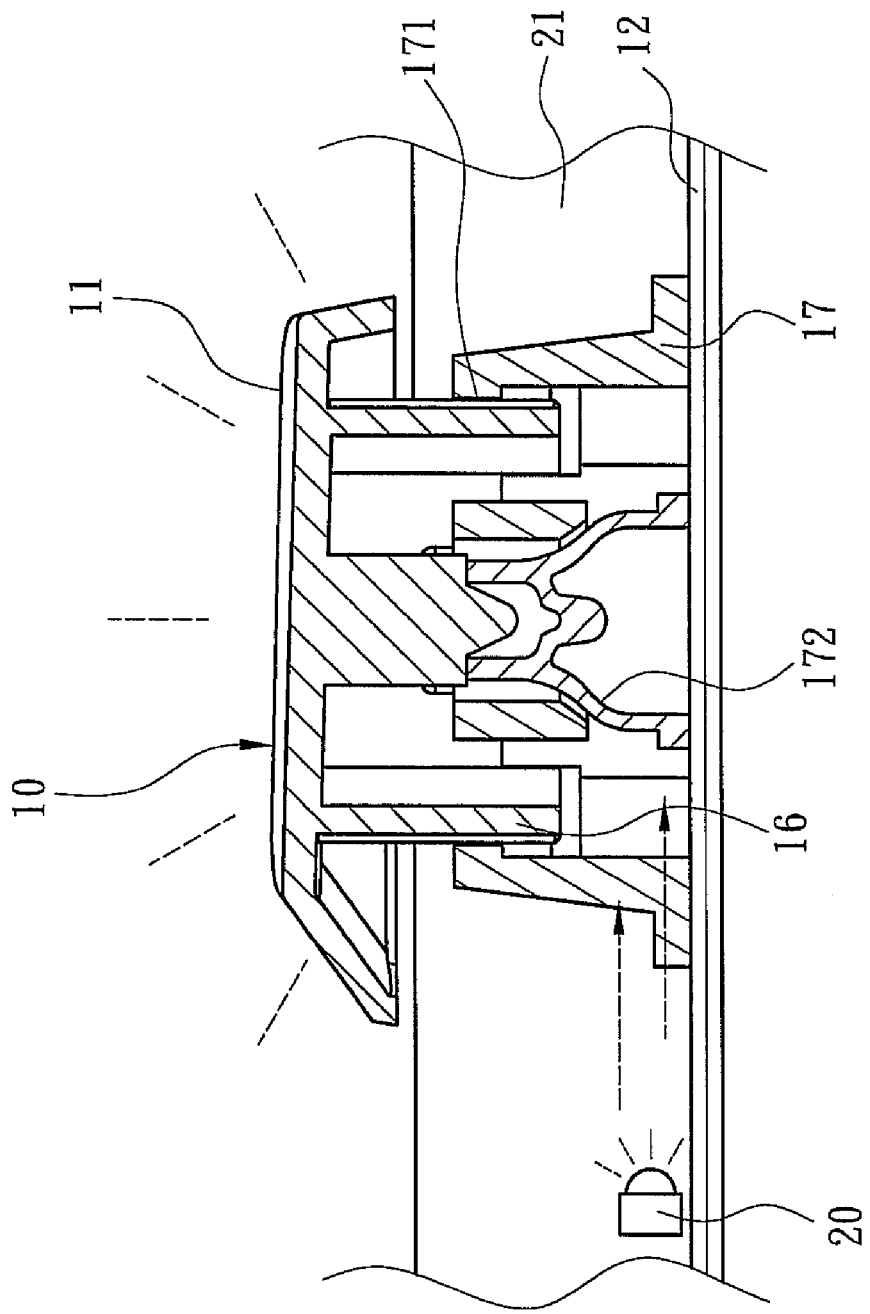
FIG. 8 is a sectional view schematically showing a slim self-luminous keyboard structure according to another embodiment of the present invention.

In another embodiment, the present invention is applied to another type of keyboard structure. Refer to FIG. 8. In this embodiment, the press member 11 has a key rod 16, and the baseplate 12 has a key seat 17 corresponding to the key rod 16. The key seat 17 has an opening 171 at the top thereof, and the key rod 16 is inserted into the opening 171. The key seat 17 also has an elastic member 172 thereinside, and the tip of the key rod 16 is corresponding to the elastic member 172, whereby the press member 11 can move up and down with respect to the key seat 17. The luminous units 20 supply light to the luminous space 21 so that users can accurately operate the press members 11 in a dim environment. To attain a non-uniform illumination, the key rods 16, key seats 17 and elastic members 172 are made of or coated with the abovementioned luminescent material. Thereby, the key rods 16, key seats 17 and elastic members 172 have a higher brightness than the adjacent luminous space 21, and users can easily recognize the press members 11 thereabove.

Figure 10:
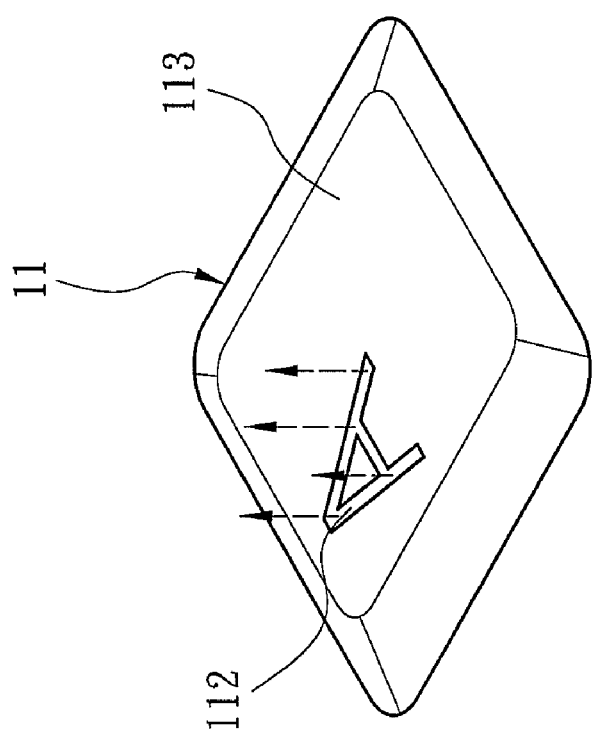
FIG. 10 is a perspective view schematically showing that light non-uniformly penetrates a press member according to the present invention.
Figure 9:
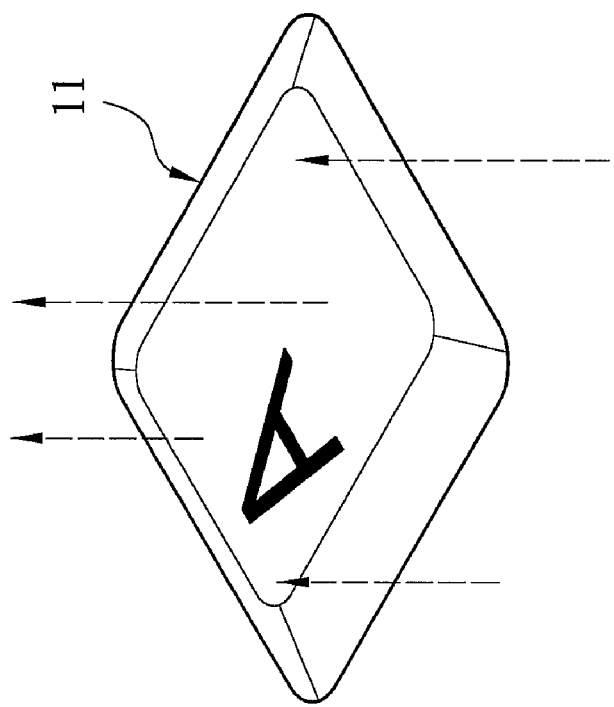
FIG. 9 is a perspective view schematically showing that light uniformly penetrates a press member according to the present invention.

Refer to FIG. 9. In yet another embodiment, the press members 11 are made of a transparent material, and light can penetrate the press members 11. Thereby, users can recognize the characters or symbols on the press members 11. Refer to FIG. 10. In a further embodiment, the press member 11 has a transparent character region 112 and an opaque non-character region 113, and the light of the luminous space 21 is blocked by the opaque non-character region 113 but penetrates the transparent character region 112. Thereby, users can see the characters and symbols more clearly.

Compared with the conventional self-luminous keyboards, the slim self-luminous keyboard structure of the present invention can provide sufficient light with fewer luminous units. Thus, the present invention consumes less power and generates less heat. Because of not using a backlight plate, the present invention can reduce the thickness of a self-luminous keyboard and facilitate fabricating a slim self-luminous keyboard. Therefore, the present invention possesses novelty and non-obviousness and meets the conditions for a patent. Thus, the Inventor files the application for a patent. It will be appreciated if the patent is approved fast.

The preferred embodiments described above are only to exemplify the present invention but not to limit the scope of the present invention. Therefore, any equivalent modification or variation according to the spirit of the present invention is to be also included within the scope of the present invention.

What is claimed is:

1. A slim self-luminous keyboard structure comprising
a keyboard unit having a press plane containing a plurality of press members and a baseplate arranged below said press plane and supporting said press members; and
luminous units generating light, wherein said light is conducted to a luminous space defined by said pressing plane and said baseplate, said luminous space allowing the press members to move up and down therein with respect to the baseplate, to make said luminous space have brightness sufficient to enable users to recognize said press members.

2. The slim self-luminous keyboard structure according to claim 1, wherein light projected by said luminous units is parallel to said baseplate.

3. The slim self-luminous keyboard structure according to claim 1, wherein height of light projected by said luminous unit increases with distance from said luminous unit.

4. The slim self-luminous keyboard structure according to claim 1, wherein an edge of said press plane and a light beam projected by said luminous units contain a projection angle.

5. The slim self-luminous keyboard structure according to claim 1, wherein said luminous space has at least one light conduction channel defined by each two said press members.

6. The slim self-luminous keyboard structure according to claim 5, wherein said luminous units are arranged in the ends of said light conduction channels and supply light to said light conduction channels.

7. The slim self-luminous keyboard structure according to claim 5, wherein said luminous units are arranged inside said light conduction channels and supply light to said light conduction channels from two sides thereof.

8. The slim self-luminous keyboard structure according to claim 5, wherein said light conduction channels are parallel to each other.

9. The slim self-luminous keyboard structure according to claim 1, wherein a light conduction element is arranged inside said luminous space.

10. The slim self-luminous keyboard structure according to claim 1, wherein reflection elements are arranged inside said luminous space and corresponding to said press members.

11. The slim self-luminous keyboard structure according to claim 1, wherein luminescent elements are arranged inside said luminous space and corresponding to said press members.

12. The slim self-luminous keyboard structure according to claim 1 further comprising an actuation mechanism coupling said press members and said baseplate and having elastic members enabling said press members to move up and down with respect to said baseplate.

13. The slim self-luminous keyboard structure according to claim 12, wherein said actuation mechanism is made of a luminescent material.

14. The slim self-luminous keyboard structure according to claim 12, wherein said elastic members are made of a luminescent material.

15. The slim self-luminous keyboard structure according to claim 12, wherein said baseplate has fix members used to fix said actuation mechanism.

16. The slim self-luminous keyboard structure according to claim 1, wherein said press members and said baseplate respectively have key rods and key seats corresponding to each other; each said key seat has an elastic member corresponding to the tip of one said key rod.

17. The slim self-luminous keyboard structure according to claim 16, wherein said key rods and said key seats are made of a luminescent material.

18. The slim self-luminous keyboard structure according to claim 16, wherein said elastic member is made of a luminescent material.

19. The slim self-luminous keyboard structure according to claim 1, wherein said press members are made of a transparent material.

20. The slim self-luminous keyboard structure according to claim 1, wherein said press member has a transparent character region and an opaque non-character region, and light penetrates said transparent character region.

* * * * *